Patented Sept. 7, 1948

2,448,998

UNITED STATES PATENT OFFICE 2,448,998

3 - (2',6' - DIMETHYLPIPERIDINO) - PROPYL SALICYLATE AND ACID ADDITION SALTS THEREOF

Samuel M. McElvain, Madison, Wis., and Thomas P. Carney, Indianapolis, Ind.

No Drawing. Application June 30, 1945, Serial No. 602,658

2 Claims. (Cl. 260—294)

1

This invention relates to organic chemical compounds and is directed to a new substituted benzoic acid ester and salts thereof.

By this invention there are provided new compounds, namely 3-(2',6'-dimethylpiperidino)-propyl salicylate which may be represented by the following formula:

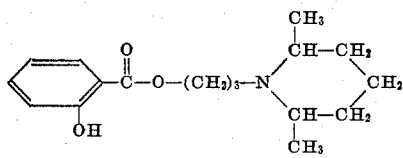

and acid addition salts thereof.

The compound in accordance with the above formula is a substituted benzoic acid ester and is a stable, water-insoluble, viscous oil at room temperature. The compound is basic in character and forms addition salts with acids.

Certain of the acid addition salts of the new 3-(2',6'-dimethylpiperidino)-propyl salicylate such as the hydrochloride, hydrobromide, sulfate and phosphate, are white, crystalline compounds which are readily water-soluble. Other acid addition salts, for example the picrate and the methylene-bis-hydroxy-naphthoate, are stable, crystalline compounds with relatively low water-solubility.

Illustratively of the salts, the hydrochloric acid addition salt of 3-(2',6'-dimethylpiperidino)-propyl salicylate may be represented by the following formula:

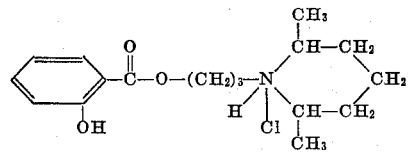

Compounds of the present invention have been found to be highly useful in therapeutics. Thus, for example, 3-(2',6'-dimethylpiperidino)-propyl salicylate hydrochloride exhibits a high degree of anesthesia with reference to nerve block and infiltration. In comparison with procaine it is effective in lower concentrations and produces a longer term of anesthesia. Furthermore it has superior surface anesthetic properties. Additionally, 3-(2',6'-dimethylpiperidino)-propyl salicylate possesses an advantage over anesthetics of the nature of procaine inasmuch as it does not interfere with the therapeutic activity of the sulfanilamide drugs which are commonly administered topically or orally as infection-combatting means.

2

The 3-(2',6'-dimethylpiperidino)-propyl salicylate of this invention may be prepared by esterification methods. Thus for example, it may be prepared in the form of its hydrohalide salt by reacting, preferably in an inert solvent, a salicylyl halide with 3-(2',6'-dimethylpiperidino)-propyl alcohol. Additionally it may be prepared as a hydrohalide salt by reacting salicylic acid with a 3-(2',6'-dimethylpiperidino)-propyl halide in a solvent such as isopropanol. For use in the above method the halide of choice is the chloride, and when such halide is used 3-(2',6'-dimethylpiperidino)-propyl salicylate is isolated as the hydrochloric acid salt. From the hydrochloride thus prepared the free ester may be prepared by treatment with alkali.

Additional salts of 3-(2',6'-dimethlpiperidino)-propyl salicylate may be prepared by treating the ester with the appropriate acid. Furthermore, one salt of 3-(2',6'-dimethylpiperidino)-propyl salicylate may be converted to a different salt by treatment with the appropriate acid and preferential crystallization.

Specific examples further illustrating the preparation of compounds of this invention are as follows:

*Example 1*

3-(2',6'-dimethylpiperidino)-propyl salicylate hydrochloride may be prepared as follows:

A mixture of 11 g. of 3-(2',6'-dimethylpiperidino)-propyl chloride, 8 g. of salicylic acid and 75 cc. of isopropanol is refluxed for about 20 hours. About half of the isopropanol is then distilled off and the residual solution cooled to about 0° C. 3-(2',6'-dimethylpiperidino)-propyl salicylate hydrochloride precipitates as a white, crystalline compound. It is filtered off, washed once with ether and recrystallized from isopropanol. 3-(2',6'-dimethylpiperidino)-propyl salicylate hydrochloride thus prepared has been found to melt at about 151–153° C. and analysis has shown the presence of 10.7 percent chlorine as compared with a calculated value of 10.8 percent.

*Example 2*

3-(2',6'-dimethylpiperidino)-propyl salicylate may be prepared as follows:

10 g. of 3-(2',6'-dimethylpiperidino)-propyl salicylate hydrochloride are dissolved in 60 cc. of water and a solution of 1.2 g. of sodium hydroxide, dissolved in 20 cc. of water, added thereto. The oily 3-(2',6'-dimethylpiperidino)-propyl salicylate which separates is taken up in ether, the ether solution separated and dried with magnesium sulfate and the ether evaporated, preferably in a vacuum, leaving the 3-(2',6'-dimethylpiperidino)-propyl salicylate as a residual, colorless oil which may be further purified by distilling under reduced pressure.

It may be noted that the compounds of this invention also may be prepared by processes of trans-esterification, condensation and partial hydrolysis.

We claim:

1. 3-(2',6'-dimethylpiperidino)-propyl salicylate represented by the following formula:

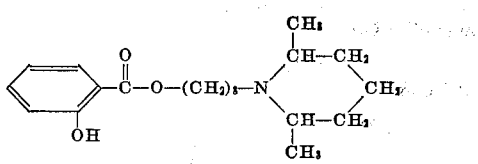

and its acid addition salts.

2. 3-(2',6'-dimethylpiperidino)-propyl salicylate hydrochloride represented by the formula:

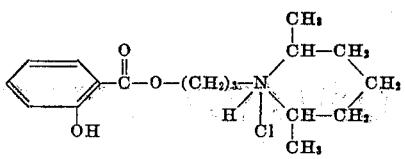

SAMUEL M. McELVAIN.
THOMAS P. CARNEY.

REFERENCES CITED

The following references are of record in the file of this patent:

UNITED STATES PATENTS

| Number | Name | Date |
|---|---|---|
| 1,784,903 | McElvain | Dec. 16, 1930 |

OTHER REFERENCES

Berichte, vol. 71, pp. 1654–1655.